(12) United States Patent
Peterhans et al.

(10) Patent No.: US 8,221,007 B2
(45) Date of Patent: Jul. 17, 2012

(54) PLUG CONNECTOR HAVING UNLOCKING MECHANISM

(75) Inventors: Adrian Peterhans, Moerschwil (CH); Patrick Zaina, Zuzwil (CH); Nesa Scopic, Herisau (CH)

(73) Assignee: Huber+Suhner AG (CH)

( * ) Notice: Subject to any disclaimer, the term of this patent is extended or adjusted under 35 U.S.C. 154(b) by 76 days.

(21) Appl. No.: 12/990,889

(22) PCT Filed: Apr. 28, 2009

(86) PCT No.: PCT/EP2009/055161
§ 371 (c)(1),
(2), (4) Date: Nov. 3, 2010

(87) PCT Pub. No.: WO2009/135787
PCT Pub. Date: Nov. 12, 2009

(65) Prior Publication Data
US 2011/0058773 A1    Mar. 10, 2011

(30) Foreign Application Priority Data
May 7, 2008    (CH) ...................................... 0707/08

(51) Int. Cl.
*G02B 6/36*    (2006.01)
(52) U.S. Cl. ................ 385/76; 385/53; 385/56; 385/60; 385/69
(58) Field of Classification Search ............... 385/53–94
See application file for complete search history.

(56) References Cited

U.S. PATENT DOCUMENTS

| 5,984,531 A | 11/1999 | Lu | |
|---|---|---|---|
| 6,206,581 B1 | 3/2001 | Driscoll et al. | |
| 6,565,262 B2* | 5/2003 | Childers et al. | 385/76 |
| 6,752,538 B1 | 6/2004 | Bates, III | |
| 6,821,024 B2 | 11/2004 | Bates, III | |
| 7,052,186 B1 | 5/2006 | Bates | |
| 7,326,075 B1 | 2/2008 | Armstrong et al. | |
| 2003/0220008 A1 | 11/2003 | Viklund et al. | |
| 2004/0247252 A1 | 12/2004 | Ehrenreich et al. | |
| 2006/0013539 A1* | 1/2006 | Thaler et al. | 385/76 |
| 2006/0089039 A1 | 4/2006 | Caveney et al. | |
| 2010/0284656 A1* | 11/2010 | Morra et al. | 385/78 |

FOREIGN PATENT DOCUMENTS

| EP | 0762558 B1 | 11/2000 |
|---|---|---|
| EP | 1091227 B1 | 5/2004 |
| EP | 0768547 B1 | 12/2005 |
| EP | 2063497 A1 | 5/2009 |
| JP | 63-184271 A | 7/1988 |

OTHER PUBLICATIONS

International Search Report dated Oct. 15, 2009, issued in corresponding international application No. PCT/EP2009/055161.

* cited by examiner

*Primary Examiner* — Brian M. Healy
*Assistant Examiner* — Guy Anderson
(74) *Attorney, Agent, or Firm* — Ostrolenk Faber LLP

(57) ABSTRACT

The present disclosure relates to an optical plug connector (1) having an improved unlocking mechanism. A locking arm (4), which protrudes toward the back in a slanted manner, is operatively connected to a collar (7) by way of a bracket (9). By displacing the collar (7) in an unlocking direction (−x), the connector (1) can be unlocked and removed from a sleeve.

16 Claims, 6 Drawing Sheets

PLUG CONNECTOR HAVING UNLOCKING MECHANISM

CROSS REFERENCE TO RELATED APPLICATIONS

The present application is a 35 U.S.C. §371 National Phase conversion of PCT/EP2009/055161, filed Apr. 28, 2009, which claims benefit of Swiss Application No. 00707/08, filed May 7, 2008, the disclosures of which are incorporated herein by reference. The PCT International Application was published in the German language.

BACKGROUND

1. Field of the Disclosure

The invention relates to the field of plug connectors, in particular plug connectors for optical cables.

2. Related Art

Plug connectors for optical cables are known from the prior art. So-called LC connectors are likewise known. In a further sense, these are push-pull connectors which have a high packing density. Corresponding connectors are manufactured by the applicant but are also available from a wide variety of other manufacturers.

European patents EP 0 762 558 B1 and EP 0 768 547 B1 describe an optical plug connector. The plug connector has a base body for accommodating the optical conductor. A structural extension member (also designated latching member or locking member) which is designed in an elastically resilient manner and has locking shoulders is integrally formed on the outside of the plug connector, the free end of said structural extension member being directed toward the rear end of the plug connector. A flange or trigger is also integrally formed on the outside of the plug connector, the free end of said flange or trigger pointing toward the front end of the plug connector in a manner protruding obliquely upward and interacting with the free end of the locking member. When the free end of the trigger, which is arranged in a fixed position, is depressed in an elastically resilient manner, the free end of the locking member is pressed toward the central axis and the plug connector can be pulled out of the socket by pulling the base body toward the rear if, or as long as, the trigger is simultaneously depressed in the process. One disadvantage is the unfavorable conduction of the forces: since a force which is directed forward is required for depressing the trigger, but a force which is directed toward the rear is required for removing the connector from a socket, the connector can be unlocked only with comparative difficulty.

European patent EP 1 091 227 B1 discloses a further design variant of a plug connector with a trigger which is fixed in position. A locking member is integrally formed on the base body. The plug connector also comprises a collar-like reinforcement element (designated yoke) with a square cross section which completely surrounds a subregion of the base body perpendicular to the central axis of the plug connector. A trigger, which is of elastically resilient design, is also integrally formed on the reinforcement element, the free end of said trigger—analogously to EP 0 762 558 B1 and EP 0 768 547 B1—interacting with the free end of the locking member which is integrally formed on the base body. During manufacture or assembly of the plug connector, the reinforcement element is pushed onto the base body along the central axis and fixed in a defined position. As in EP 0 762 558 B1 and EP 0 768 547 B1, the plug connector can be pulled out of the socket when the trigger is depressed onto the locking member and, at the same time, the plug connector or base body is pulled toward the rear.

U.S. Pat. No. 6,565,262 B2 discloses a further design variant of a plug connector with a trigger which is fixed in position. As in EP 1 091 227 B1, a locking member, which protrudes toward the rear in an oblique manner, is integrally formed on a base body of the plug connector, it being possible for said locking member to likewise be operated by a trigger. The trigger is integrally formed on a protective collar which is arranged in a fixed manner in the axial direction and has a substantially C-shaped cross section. The protective collar can be snapped onto the base body or the conductor both in a direction which is diverted away from the central axis, and also pushed toward and onto the base body in the direction of the central axis. In the functional position which meets requirements, the protective collar is mounted or positioned on the base body in a fixed manner; projections from the protective collar engage in corresponding cutouts in the base body. The plug connector can be removed from the collar when—as in the case of the preceding prior art—the trigger is pressed downward and the plug connector is pulled toward the rear at the same time. In this case, the protective collar is not displaced toward or in relation to the base body.

US patent application US 2004/0247252 A1 discloses a plug connector which consists of a base body and an unlocking element. The base body and the unlocking element are coupled to one another in an interlocking manner and are designed in such a way that an optical conductor can be received in the direction of the central axis. A locking member which protrudes obliquely toward the rear is fitted on the outside of the base body by means of a hinge. The base body also has, on the side, a continuous recess which interacts with a tongue of the unlocking element and determines the travel of the displacement between the base body and the unlocking element along the central axis. The unlocking element comprises a dimensionally stable structure which protrudes from the central axis and has a shaft which accommodates the free end of the locking member. When the unlocking element is pulled toward the rear along the central axis, the locking member is pressed against the base body and, in the process, unlocks the plug connector, and therefore the plug connector can be pulled out of the socket. In comparison to the prior art which is acknowledged above, the trigger does not have to be held in a depressed position as the plug connector is being pulled toward the rear, while the unlocking element—and not the basic housing—is pulled toward the rear. One disadvantage is that the unlocking element has a very complicated structure.

U.S. Pat. No. 6,752,538 B1, U.S. Pat. No. 6,821,024 B2 and U.S. Pat. No. 7,052,186 B1 each disclose a plug connector or a pair of coupled plug connectors having an apparatus which is intended to prevent unintentional unlocking. In order to prevent unintentional unlocking of the locking member, a securing collar, which can be displaced in the direction of the central axis, is mounted on the base body. The securing collar can firstly be pushed forward by way of the rear end of the operating element, so that the front end of the operating element engages beneath the locking member, therefore presses said locking member upward and additionally locks said locking member, that is to say protects it against being unintentionally released. If the securing collar is pushed toward the rear, the front end of the operating element is no longer positioned beneath the locking element, and this locking element can therefore be pressed downward in order to unlock the connector in the usual manner.

U.S. Pat. No. 5,984,531 discloses an optical connector which has an integrated cover which opens automatically when the connector is inserted and closes again when it is removed. An arm, which is mounted on the rear end of the housing and protrudes obliquely forward, serves as a locking member. A sleeve which is pressed into the housing from the rear as far as a stop and has an integrally formed crimping neck closes off the connector at the rear. At the same time, the sleeve serves as an abutment for supporting a spring which is arranged in the interior and is clamped between the sleeve and a ferrule holder and actively presses said sleeve forward.

U.S. Pat. No. 6,206,581 is directed at an optical connector with an integrally formed housing. A locking member is integrally formed on a side wall in the front region of the housing and protrudes upward and obliquely toward the rear. Said locking member is of resilient design and, in its rear region, can be pressed elastically against the side wall of the housing for unlocking purposes. In order to close the housing, a sleeve which is provided with laterally protruding locking elements is inserted into a longitudinal opening in the housing from the rear until the locking elements of the sleeve latch into correspondingly provided lateral openings in the housing. The cross section of the longitudinal opening is of rectangular or polygonal design at least at the rear end. In the rear region, the housing has slots which run in the longitudinal direction and allow the housing sides to be bent outward when the locking elements latch in. The cross section of the sleeve is designed such that the sleeve cannot rotate about its longitudinal axis in the latched-in state on account of its interlocking design. An unlocking element which is fitted onto the connector housing from the rear has an unlocking lug which protrudes obliquely forward and upward and can be pressed forward and downward onto the rear end of the locking element, so that said locking element is unlocked. Therefore, depending on the configuration, more than one connector can be unlocked at the same time. Further connectors of a similar nature are also known from U.S. Pat. No. 5,481,634 and, respectively, U.S. Pat. No. 5,579,425. The housings of these connectors are closed at the rear end by a correspondingly configured cover which is produced by injection molding.

One disadvantage of the solutions known from the prior art is the unfavorable conduction of forces during unlocking, and also the complicated structure. Many of the known connectors require two movements—the trigger being pressed downward and the plug connector being pulled toward the rear—to be performed approximately synchronously in order for said connectors to be released from the socket. Other plug connectors are distinguished by a complicated structure which has a disadvantageous effect on the manufacturing costs.

SUMMARY

One object of the invention is to overcome the disadvantages of the connectors known from the prior art. A further object of the invention is to specify an optical connector which is distinguished by simplified operability.

The object is achieved by the connectors defined in the independent patent claims.

In contrast to the connectors known from the prior art, a connector according to the invention has a structure which is simple to manufacture. In addition, the forces required for unlocking and removal are matched to one another such that operation is markedly simplified.

Further advantages include a higher packing density in comparison to that of the connectors known from the prior art, this having an advantageous effect on the arrangement. A plurality of connectors, or connector pairs, can be arranged one above the other and/or next to one another in a narrow space. The connectors have a lower overall height. Secondly, unlocking with higher packing densities is not problematic since it is not necessary to press the unlocking lever downward from above as is customary. Put simply, the fingers are outside the region of the locking arms during the unlocking operation.

Connectors of this generic type generally have a largely standardized structure with a single- or multi-part base body and a locking arm which is mounted on said base body and protrudes obliquely toward the rear. The connectors are designed in such a way that they can latch into sockets provided for them. Locking shoulders which project laterally from the locking arm are snapped into a rear-engagement means in the socket and thus prevent the connector from unintentionally slipping out of the socket. For unlocking purposes, the locking arm can be pressed against the base body in such a way that the locking shoulders are moved out of the rear-engagement means and thus release the connector so that it can be removed from the socket. The base body has a continuous opening in which an optical fiber is arranged. At the front end, the optical fiber issues into a ferrule which is mounted in a resilient manner in the longitudinal direction and is usually composed of ceramic. At the rear end, the connectors generally have a crimping neck which serves for connection of a cable jacket of the optical cable. A spring, which presses against a block which is mounted in the region of the rear end of the ferrule, is generally arranged in the interior of the connector. The housings of the connectors are typically manufactured from injection-molded plastic.

In the connectors known from the prior art, a clip generally has to be pressed forward and downward for unlocking purposes, before the connector can be removed from a socket in the opposite direction toward the rear. These force conditions are unfavorable since while one force is exerted forward and downward, a greater opposing force has to be superimposed toward the rear in order to unlock and to remove the connector.

In one embodiment of the invention, this disadvantage is avoided by a force toward the rear—that is to say in the removal direction—primarily being required for unlocking purposes. Operator control is markedly simplified by virtue of this vectorial coordination of the forces. In terms of design, this is achieved by an unlocking element being arranged on a base body of the connector, it being possible for said unlocking element to be displaced in relation to said base body and said unlocking element being operatively connected to a locking arm.

The unlocking element generally has a displacement element which can be displaced in relation to the base body. A clip which is integrally formed on the displacement element or is operatively connected to said displacement element serves to transform the movement of the displacement element into a force which serves to unlock the locking clip. In this case, the clip is designed, or operatively connected to the locking arm, in such a way that the connector can be snapped into a socket without problems, that is to say the locking arm can execute the movement required for locking purposes in the direction of the base body without a high degree of complexity and obstruction.

One embodiment of the invention relates to a plug connector having a base body and an articulated locking arm which is integrally formed in the region of the front end of the base body and protrudes toward the rear in an oblique manner. A collar-like displacement element surrounds the rear region of the base body at least in regions and can be displaced in relation to said base body in the longitudinal direction. The unlocking element is operatively connected to the locking arm by means of a clip. The operatively connected locking arm is unlocked by the unlocking element being displaced in an unlocking direction. Depending on the design and the field of use, the clip and the locking arm and/or the clip and the displacement element can be of integral design. Thin areas, for example in the form of film hinges, guarantee the requisite mobility in this case. Depending on the design, the displacement element can be operatively connected to the base body in a permanent or detachable manner. In the case of a detachable design, the displacement element can have a C- or U-shaped cross section which partially surrounds the base body. The displacement element can be designed in such a way that it can be snapped onto one or more connectors at the same time. In the case of a non-detachable design, the displacement element can have an annularly closed cross section which surrounds the base body.

The unlocking forces, and the removal forces which are required to remove the plug connector from the socket, are normally transmitted from the displacement element, by means of the clip, to the locking arm, and from there to the base body. The locking arm is first unlocked by pulling the displacement element, and then the base body of the connector is pulled out of the socket. If required, the displacement element and/or the base body can have means for limiting displacement, for example in the form of mechanical stops.

If required, the plug connector has coupling means which serve for lateral operative connection to a further plug connector. Depending on the field of use, the coupling means can be arranged on the base body and/or the displacement element. In one embodiment, the coupling means are projecting pins and recesses which are formed so as to correspond to said pins and which prevent the plug connectors from twisting in relation to one another.

The coupling means can be designed such that two connectors can be permanently connected to another by said coupling means. As an alternative or in addition, a retaining clamp (connector clamp) which is suitable for holding two or more connectors can be provided. The retaining clamp may be suitable for jointly unlocking the connectors.

As already mentioned above, US 2004/0247252 discloses a connector with a very complicated structure. Although this connector has a displaceable part, it cannot be compared, in respect of the structure and the manner of operation, with a connector according to the invention disclosed in this document, which, amongst other things, can be produced in a substantially simpler manner. The connector known from US 2004/0247252 has a displaceable rear part which forms the entire rear region of the connector. Depending on the embodiment, the displaceable part interacts with the locking arm by means of one or more short, steep ramps which are arranged in the interior of the housing. The ramps are arranged on a rigid, non-deformable structure. By displacing the rear part in relation to a front part of the connector, the locking arm is pressed downward by sliding along the ramp and the locking arm is thus unlocked. Disadvantages of this design are, in addition to the construction-related sliding friction which occurs, the complicated structure which has a negative effect on the manufacturing costs of the connector. A further disadvantage is that the ramp produces unfavorable force conditions on account of its design and arrangement and gradient. A further disadvantage is that, on account of the design, it is not clearly defined when the connector is unlocked. In addition, it is not clear whether the connector can actually be both unlocked and also removed by pulling the rear part. These disadvantages are avoided by the connectors according to the invention.

BRIEF DESCRIPTION OF THE DRAWINGS

The invention will be explained in greater detail with reference to the exemplary embodiments which are shown in the following figures in which.

Corresponding elements are provided with identical reference symbols in the figures.

DETAILED DESCRIPTION OF THE EMBODIMENTS

Figure 1:
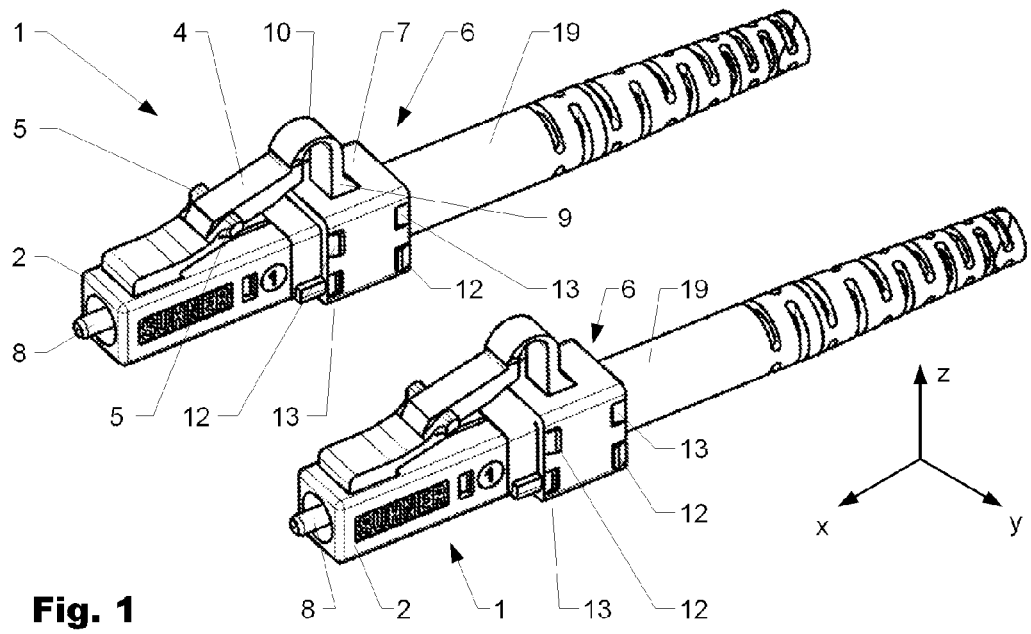
FIG. 1 shows a perspective illustration of two examples of a first embodiment of a plug connector obliquely from the front and above.
Figure 2:
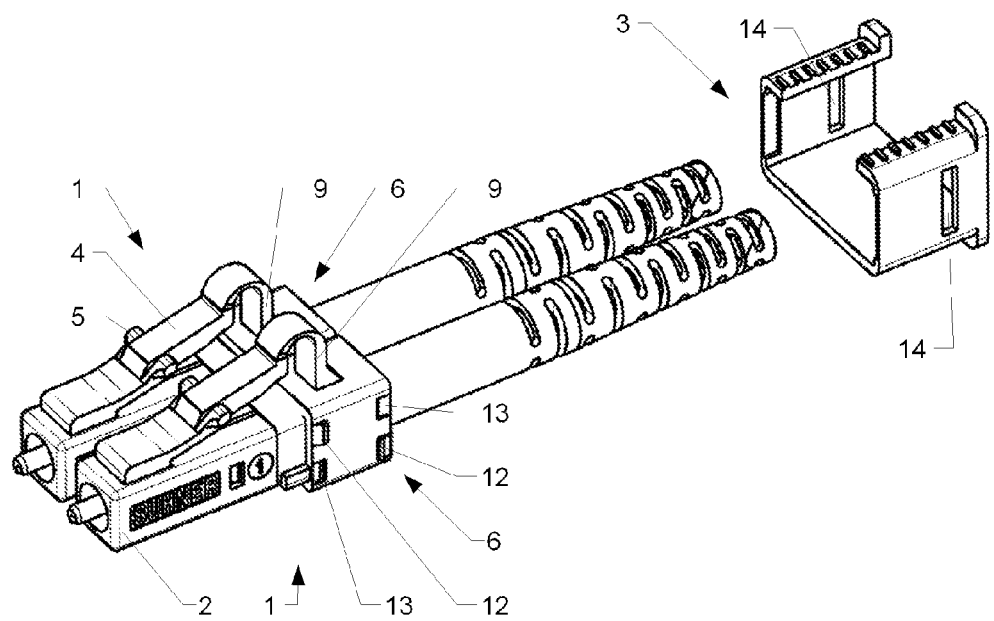
FIG. 2 shows a perspective view of two plug connectors according to FIG. 1 which are arranged next to one another and a connecting clamp obliquely from the front and above.
Figure 3:
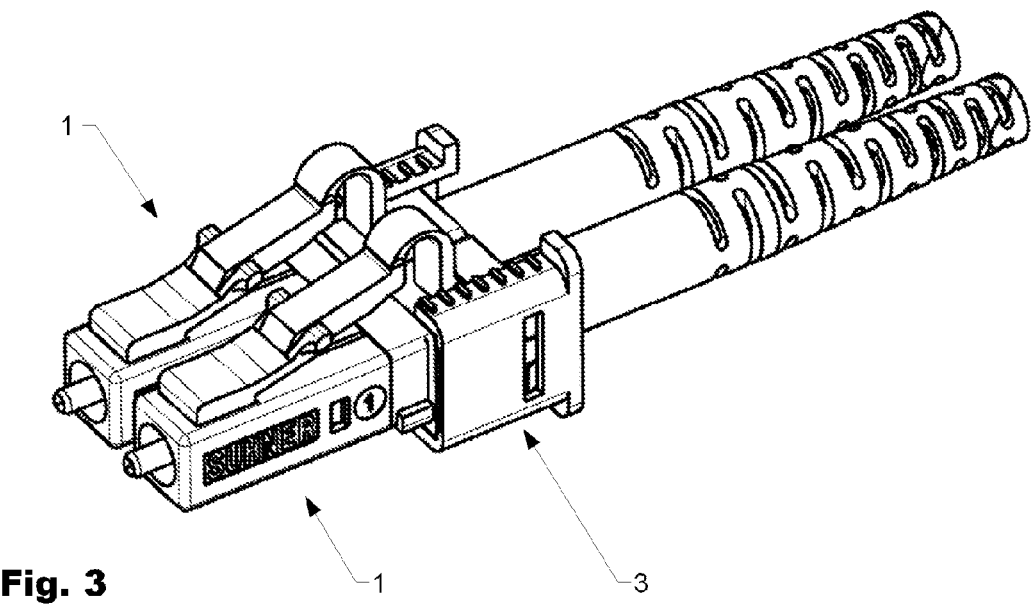
FIG. 3 shows a perspective view of the plug connectors according to FIG. 2 with an operatively connected connecting clamp obliquely from the front and above.
Figure 4:
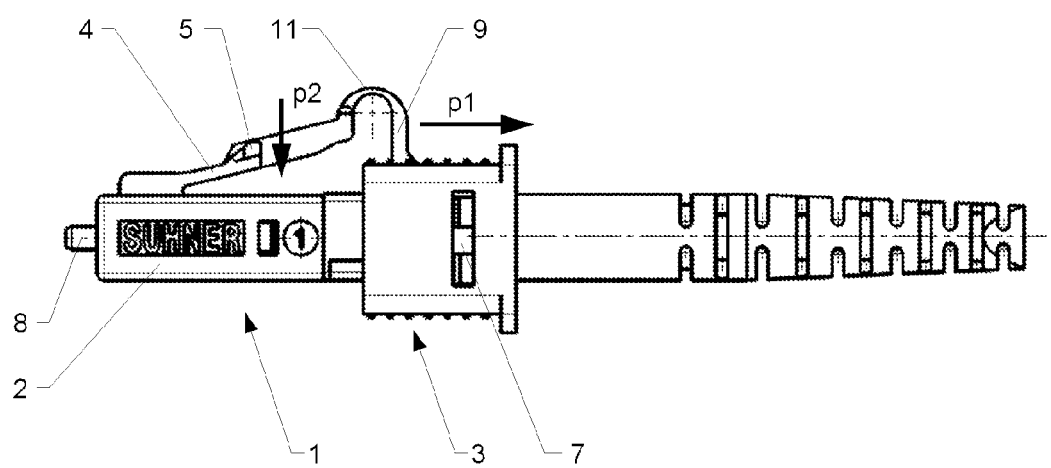
FIG. 4 shows a side view of the plug connectors according to FIG. 3.

FIG. 1 shows two connectors 1 in a first embodiment side by side. FIG. 2 shows the connectors 1 according to FIG. 1 joined laterally, together with a connector clamp 3 which is not yet operatively connected. FIG. 3 shows a perspective illustration of the two connectors 1 according to FIG. 1 obliquely from the front and above. The connectors 1 are situated side-by-side and operatively connected by means of the connector clamp 3. FIG. 4 shows the connectors according to FIG. 3 from the side.

The connectors 1 have a base body 2 and a blocking arm 4 which protrudes in an elastically resilient manner obliquely toward the rear from the front end of the base body 1. Laterally projecting locking shoulders 5 are arranged on the locking arm 4 and serve to snap into corresponding recesses in a correspondingly designed socket (not illustrated). A ferrule 8 for accommodating and for connecting an optical conductor (not illustrated in any detail) can be seen at the front end of the base body 2.

An unlocking element 6 is arranged on the base body 2. Said unlocking element has a collar (displacement element) 7 which at least partially surrounds the base body 2 and can be displaced in relation to said base body in the longitudinal direction (x direction). The unlocking element 6 is arranged in front of an anti-kink sheath 19 in the axial direction.

A clip 9 is arranged on the collar 7 so as to project, said clip being operatively connected to the locking arm 4 in an articulated manner. In the embodiment shown, the articulated operative connection is provided by one or more thin areas 10. Depending on the embodiment, the clip 9 can be of elastically resilient or rigid design. The thin areas 10 can be designed as film hinges.

By virtue of the collar 7 being displaced in the direction of the rear end (x direction) of the connector 1, the clip 9 exerts a force on the locking arm 4 and pulls said locking arm downward in the direction of the base body 2. The locking shoulders 5 are likewise displaced downward, and therefore they are unlocked and release the connector 1. The forces exerted on the collar 1 simultaneously serve for removal of the connector 1 from a socket.

The two connectors 1 have, in the region of the collars 7, coupling means in the form of projecting elements 12 which—as illustrated in FIG. 2—can engage in correspondingly designed recesses 13 in an adjacent connector 1. The projecting elements 12 and the recesses 13 serve to operatively connect two connectors to one another. At the same time, they prevent unintentional twisting or displacement of the connectors 1 relative to one another. In the embodiment shown, the connector clamp 3 has a substantially C-shaped cross section which surrounds the connectors 1 on three sides. Other single- or multi-part designs are possible. In the embodiment shown, the connector clamp 3 can—as illustrated in FIG. 3—be snapped over the collars 7 of the two connectors 1 from the rear, so that said connectors are firmly connected to one another and to the connector clamp 3. In the embodiment shown, the operative connection is established by corresponding snap-action connection means in the form of projecting elements 12 and correspondingly designed recesses 14.

On account of the connector clamp 3, as schematically indicated in FIG. 4 (arrow p1), being pulled in the direction of the rear end of the connector 1 (cf. FIG. 4), the clips 9 are stretched and therefore the locking arms 4 which are operatively connected to said clips are pulled in the direction of the base body 2 together with the locking shoulders 5 (arrow p2).

Figure 5:
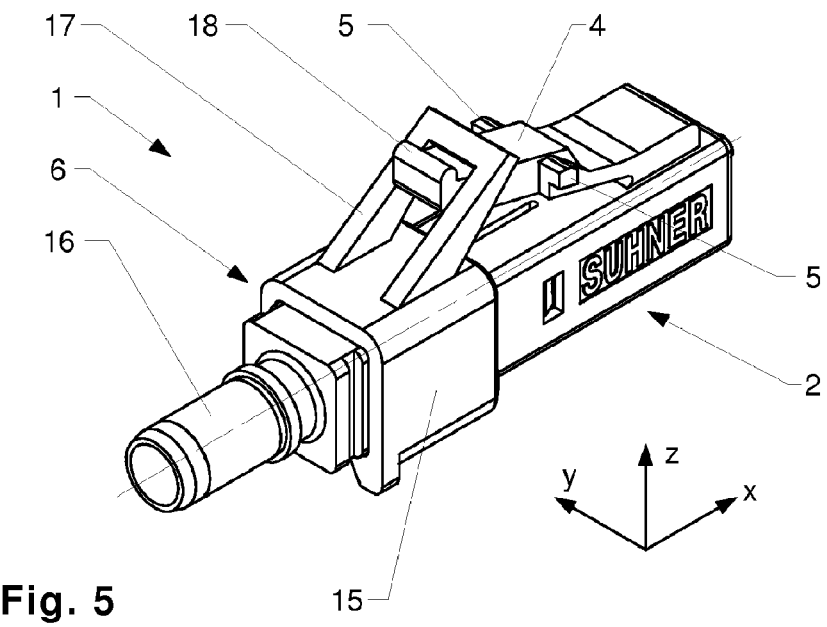
FIG. 5 shows a perspective view of a second embodiment of a plug connector obliquely from the rear.
Figure 6:
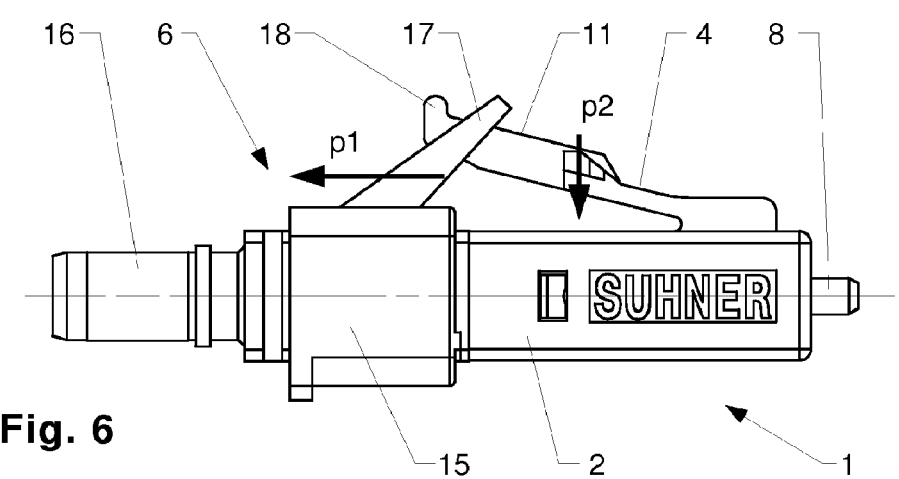
FIG. 6 shows the plug connector according to FIG. 5 from the side.
Figure 7:
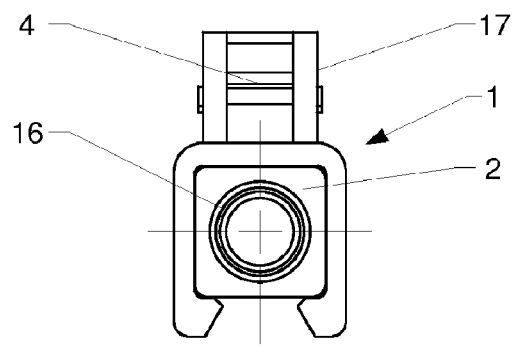
FIG. 7 shows the plug connector according to FIG. 5 from the rear.

FIG. 5 shows a view of a plug connector 1 according to the invention obliquely from the rear and above. FIG. 6 shows a side view of the connector 1 according to FIG. 4. FIG. 7 shows a view of the connector from the rear.

The plug connector 1 has a base body 2, a locking arm 4 and an unlocking element 6. A crimping neck 16 can be seen at the rear end, said crimping neck serving for connection of an optical cable (not illustrated in any detail).

The locking arm 4 is arranged so as protrude obliquely toward the rear and upward from the front end of the base body 2 and is of elastically resilient design. The locking arm 4 has a locking shoulder 5 on either side, said locking shoulders serving to lock the plug connector 1 in a correspondingly designed socket in a known manner.

In the embodiment shown, the unlocking element 6 has a collar-like displacement element 15 which can be displaced on the base body 2 and has integrally formed on it a clip 17 which projects obliquely forward in the direction of the locking arm 4 and surrounds the locking arm 4 in the region of the rear end. On account of the interaction with the locking arm 4 which runs obliquely upward in a ramp-like manner (ramp 11) in the rear region, said locking arm is pressed downward to a defined extent by the clip 17 when the collar 15 of the unlocking element 5 is pulled back (arrow p1). Since the locking shoulders are moved downward as a result (arrow p2), the connector is unlocked. In the embodiment shown, a mechanical stop 18 prevents the clip 17 from slipping off the locking arm 4. At the same time, the stop 18 can serve to transmit to the locking arm 4 the forces which are required for removing the connector.

In the embodiment shown, the clip 17 is designed in such a way that the rear end 18 of the clip 4 can still be operated from the outside and, if required, can be depressed manually.

As can be seen in FIG. 7, the unlocking element 6 is designed as a snap-action element in the embodiment shown, it being possible for said snap-action element to be snapped onto the connector 1 subsequently.

To this end, the collar (displacement element) 15 is designed to be open in the lower region. The cross section is of substantially C-shaped design. Other designs are possible. However, the collar can also be of closed design, for example by a flap which is integrally formed by means of a hinge, or a mating element. The clip 17 can be designed such that it actively presses the locking arm 4 upward in a front position and therefore prevents unintentional unlocking. If required, the clip 17 can be designed in such a way that it latches in a rear position and therefore securely holds the locking arm 4 in an unlocked position.

If required, the unlocking element 6 can be designed such that it is suitable for accommodating and coordinating more than one connector. In this case, the displacement element 15 is designed such that more than one base body 1 can be operatively connected to it. In one embodiment, the cross section has a double-C-shaped design in which the two substantially C-shaped cross sections are situated back-to-back or side-by-side. Other designs are possible. In this case, the unlocking element serves to hold and to coordinate the movements of the two connectors. In this case, the unlocking element assumes the function of the connector clamp 3 of the exemplary embodiment from FIGS. 1 to 4.

Figure 8:
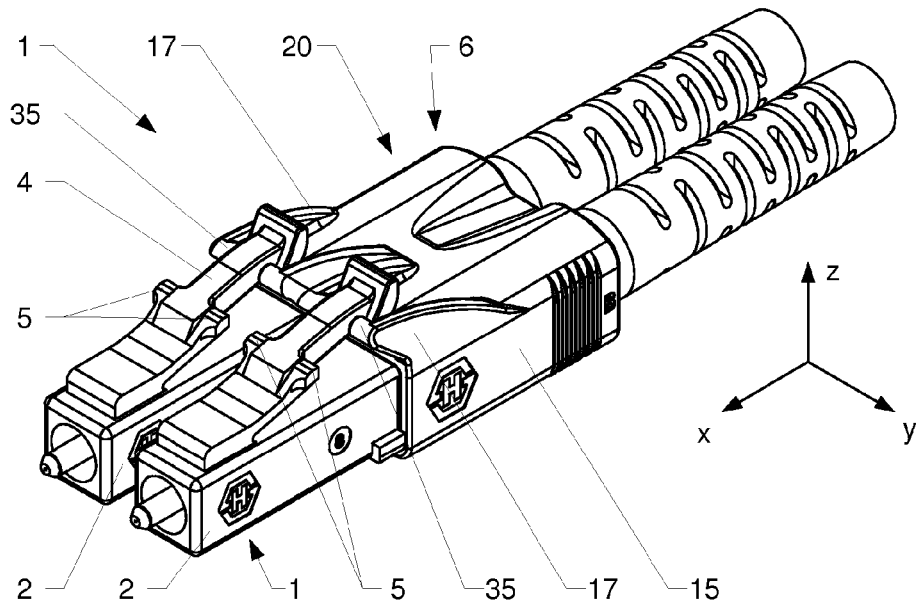
FIG. 8 shows two further plug connectors obliquely from above and operatively connected to one another.
Figure 13:
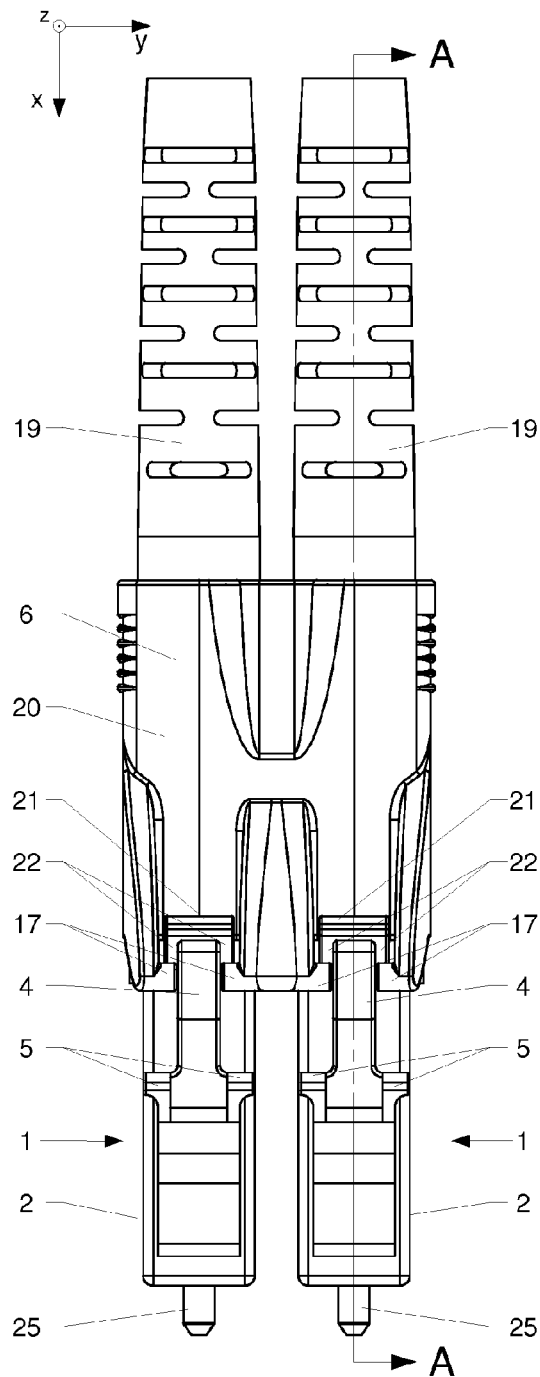
FIG. 13 shows a plan view of the two connectors according to FIG. 8.
Figure 14:
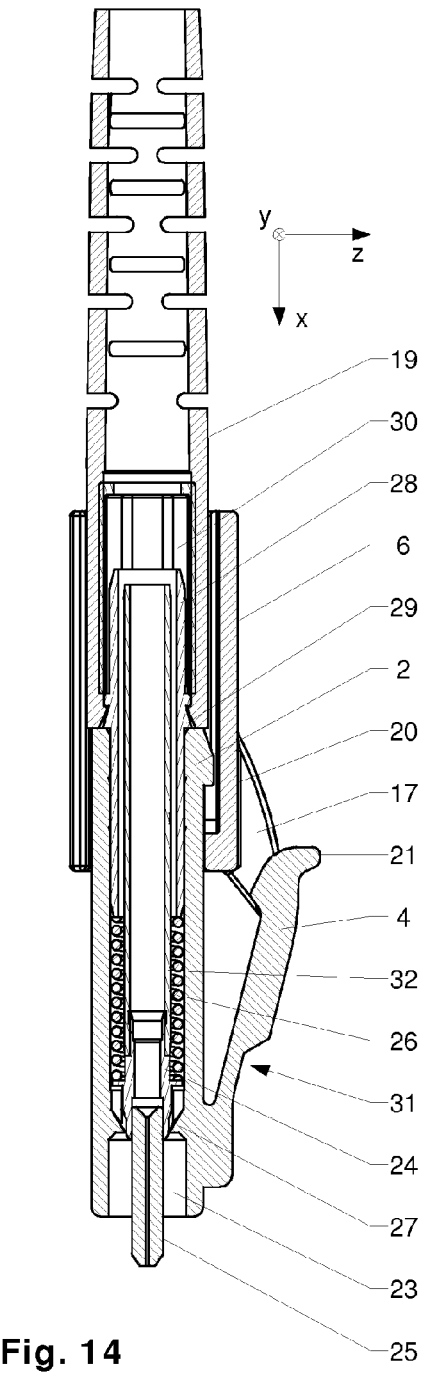
FIG. 14 shows a sectional illustration along section line AA according to FIG. 13.

FIG. 8 shows a perspective illustration of two connectors 1 of a third embodiment obliquely from above. FIG. 13 shows a plan view of the connectors 1 according to FIG. 8. FIG. 14 shows a section through the arrangement of FIG. 13 along section line AA. The two connectors 1 illustrated in FIGS. 8 and 13 are operatively connected to one another by means of a connector clamp 20 which simultaneously serves as an unlocking element 6.

Figure 9:
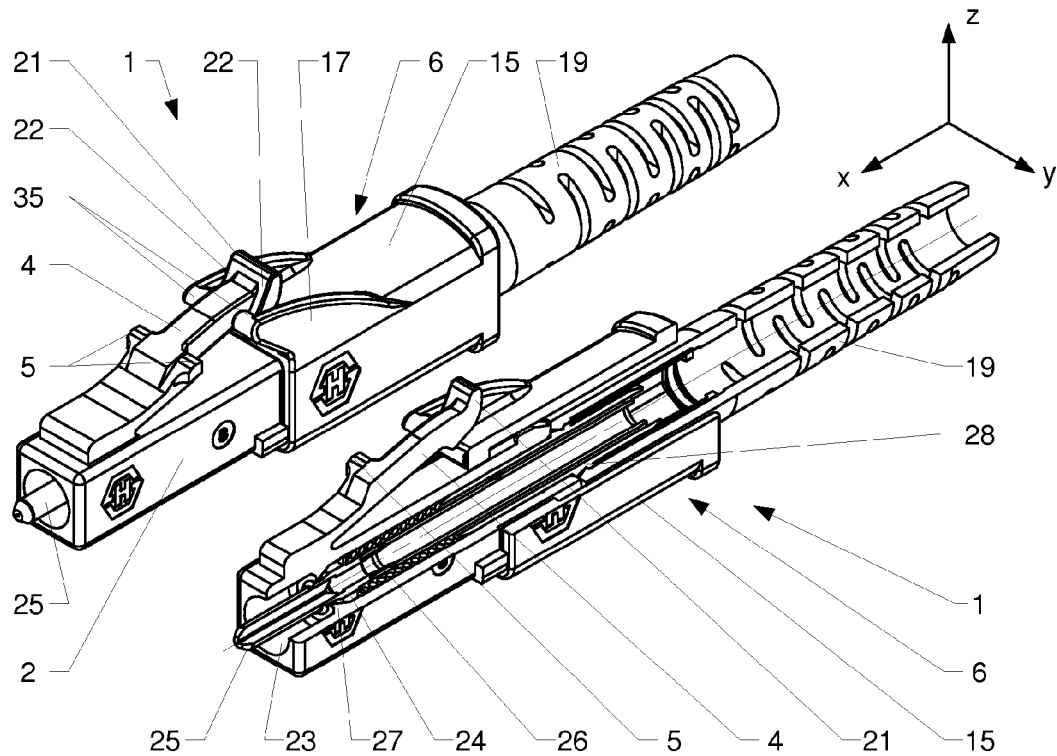
FIG. 9 shows an illustration of the two plug connectors according to FIG. 8 in the separated state and partially in section.

FIG. 9 shows two connectors 1 according to FIG. 8 side-by-side. The connector 1 which is at the front as seen by the viewer is illustrated partially in section so that the internal structure can be seen more clearly. In contrast to the arrangement according to FIG. 8, each connector 1 has its own unlocking element 6. If required, the unlocking elements may have operative connection means (not illustrated further) by means of which two unlocking elements can additionally be operatively connected to one another.

The plug connectors 1 each have a base body 2, a locking arm 4 and an unlocking element 6. The locking arm 4 is arranged so as to protrude obliquely toward the rear and upward from the front end of the base body and is of elastically resilient design in the embodiment shown (other designs are possible). The locking arm 4 has a locking shoulder 5 on either side, said locking shoulder serving to lock the plug connector 1 in a correspondingly designed socket in a known manner. The unlocking element 6 has a collar-like displacement element 15 which can be displaced in relation to the base body 2 and has integrally formed on it a clip 17 which projects obliquely forward in the direction of the locking arm 4 in this case. At the rear end, the locking arm 4 has a thick area 21 which, in this case, forms a ramp 22 on each side of the locking arm 4 and is surrounded by the clip 17. To this end, the clip has an inwardly projecting pin 35 on each side. For unlocking purposes, the unlocking element 6 is pulled toward the rear (x direction) on the base body 2, for example using the thumb and forefinger. As a result, the clip 17, or the pins 35, forms/form an operative connection with the ramps 22 and thus press the rear part of the locking arm 4 downward toward the base body 2 on account of the gradient of the ramp 22. As a result, the locking shoulders 5 are likewise pulled downward, and this leads to the connector 1 being unlocked. A low configuration with precise conduction is possible by virtue of the selected arrangement and design.

Figure 10:
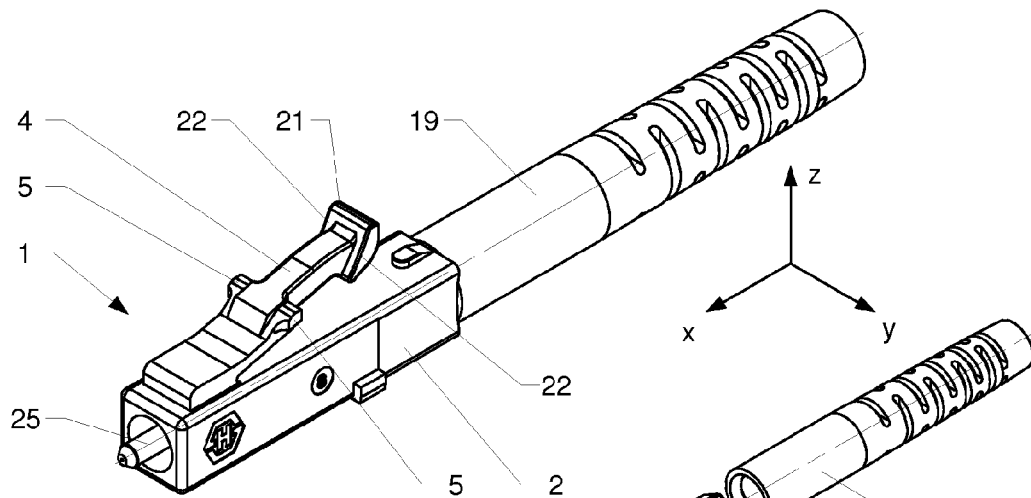
FIG. 10 shows a plug connector according to FIG. 8 without an unlocking element.
Figure 11:
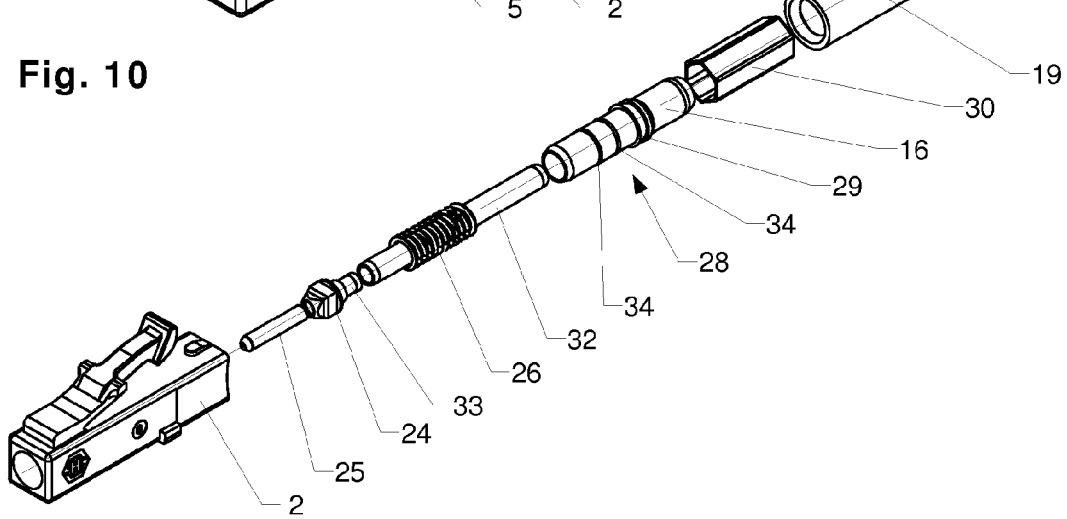
FIG. 11 shows an exploded illustration of a plug connector according to FIG. 8.

FIG. 9 (front connector) and FIG. 14 (sectional illustration along section line AA according to FIG. 13) and the exploded illustration according to FIG. 11 show the internal workings of the connector. FIG. 10 illustrates the connector according to FIG. 11 in the assembled state. The connector according to FIG. 10 can, if required, also be used without the unlocking element 6. In this case, the thick area 21 at the end of the locking arm 4 is not necessarily required either.

As can be seen in FIGS. 9 and 14, the base body 2 has a continuous opening 23 in the longitudinal direction. A ferrule holder 24 with a ferrule 25, which serves to accommodate an optical fiber (not illustrated further), is inserted into said opening from the rear end. The ferrule holder 24 is pressed against a shoulder 27, which is formed in the interior of the opening 23, by a prestressed spring 26. The ferrule holder has a polygonal cross section which interacts with a correspondingly designed indentation in the shoulder 27 in an interlocking manner. By virtue of this design, the ferrule holder can be positioned about its axis for fine adjustment purposes. The spring 26 is supported at the rear on a press-in sleeve 28 which is pressed into the base body 2 and, in the embodiment shown, projects beyond the base body 2 and at the same time serves as a crimping neck. Similar connector designs are known from other connectors from the prior art (cf., for example, U.S. Pat. No. 5,984,531) but these connectors form part of another generic type and are significantly larger, and therefore they have a significantly greater wall thickness in the region of the sleeve. The packing density is accordingly poorer in comparison to the connectors according to the invention disclosed in this document. Comparable designs have, to date, been regarded as being impossible to achieve in the connector class of LC connectors under discussion here and were therefore not known either. The requisite pull-out values when pulling the cable in the longitudinal direction of the connector and transverse thereto are achieved by virtue of the special design and matching of the press-in sleeve 28.

As can be seen particularly clearly in FIGS. 11 and 13, the press-in sleeve 28 has a stop edge 29 which determines the press-in depth of the press-in sleeve 28 into the opening 23 in the base body 2. In the rear region, the press-in sleeve has a crimping neck 16. When fitting the connector 1 to a cable (not illustrated further), the cable jacket is pushed onto the crimping neck 16 and fixed by a compressed crimping sleeve 30. An anti-kink means 19, which is not necessarily required for the actual functioning of the connector 1, can be pushed onto the crimping sleeve 30 as a termination.

The sectional illustration according to FIG. 13 shows the structure and the internal workings of the connector 1 in the assembled state. The locking arm 4 has, in the region of its connection to the base body 2, a thin area 31 which improves the elastic spring behavior during unlocking operations.

At the rear end, the ferrule holder 24 merges with a flexible tube 32 which projects through the spring 26 and into the press-in sleeve 28 in the assembled state. By virtue of this design, the requisite lateral mobility of the ferrule holder 24 in the interior of the base body 2 is not impeded. Nevertheless, the cable is protected against the spring 26. Furthermore, the flexible tube 29 serves, if required, as an assembly aid. A further advantage is that, when the connector is adhesively bonded, the adhesive is prevented from unintentionally establishing a connection with the spring 26 and the press-in sleeve 28.

As can be seen in FIG. 11, the ferrule holder 24 has, at the rear end, a connection region 33 onto which the tube 32 can be pushed and adhesively bonded. Other attachment methods are possible. In the embodiment shown, the press-in sleeve 28 has two radially projecting teeth 34 which are spaced apart from one another and engage in the manner of teeth in the opening 23 in the material of the base body 2 during the press-in operation. The teeth 34 can have different diameters, and this can improve the effect. The length of the active region (region which is pressed in) of the press-in sleeve 28 corresponds to twice or three times the diameter. In contrast to the prior art, no longitudinally running strain-relief slots are required in the base body 2 in the connector disclosed in this document. As a result of the relaxation of the material, the teeth are embedded in the material of the base body such that they are protected against being pulled out.

FIG. 14 shows perspective illustrations of a single (a) and the double (b) unlocking element 6 obliquely from below. The two unlocking elements 6 are designed as snap-action elements which can be snapped onto one (a) or two (b) connectors 1 according to FIG. 10. To this end, the collar (displacement element) 15 is designed to be open in the lower region. The cross section is substantially C-shaped, or double-C-shaped. Other designs are possible. However, the collar can also be designed to be closed, for example by a flap which is integrally formed by means of a hinge, or a mating element. The clip 17 can be designed such that it actively presses the locking arm 4 upward in a front position and therefore prevents unintentional unlocking. If required, the clip 17 can be designed in such a way that it latches in a rear position and therefore securely holds the locking arm 4 in an unlocked position.

Figure 12:
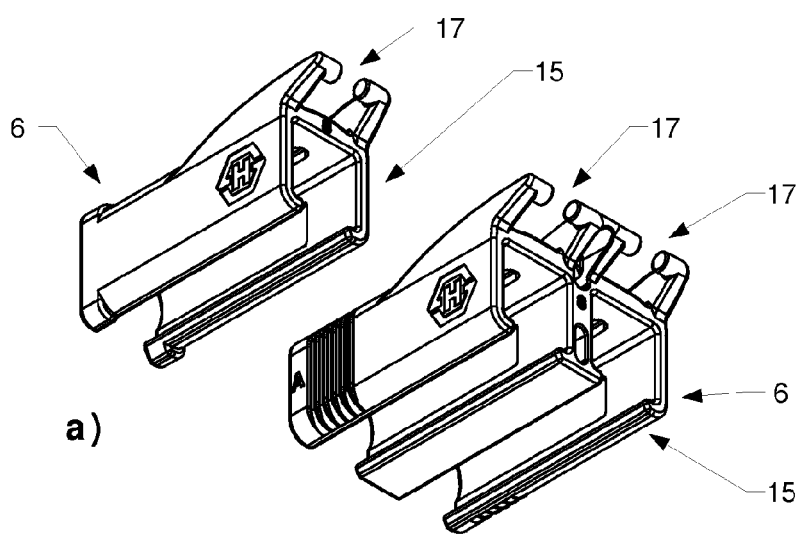
FIG. 12 shows an unlocking element for a connector and an unlocking element for two connectors.

In FIG. 12(b), the unlocking element 6 is designed such that it is suitable for accommodating and coordinating more than one connector. In this case, the displacement element 15 is designed such that more than one base body 1 can be operatively connected to it. In one embodiment, the cross section has a double-C-shaped design, in which the two substantially C-shaped cross sections are situated back-to-back or side-by-side. Other designs are possible. In this case, the unlocking element serves to hold and to coordinate the movements of the two connectors.

The connectors 1 according to FIGS. 8 to 14 allow a particularly low structure. In addition, the open (not continuous) design of the clip 17 enables the locking clip 4 to be operated manually or using a tool.

LIST OF REFERENCE SYMBOLS

1 Connector
2 Base body
3 Connector clamp
4 Locking arm
5 Locking shoulder
6 Unlocking element
7 Displacement element (collar)
8 Ferrule
9 Clip
10 Articulated joint 11 Ramp
12 Projecting element
13 Indentation
14 Recess
15 Displacement element
16 Crimping neck
17 Clip
18 Mechanical stop
19 Anti-kink means
20 Connector clamp
21 Thick area
22 Ramp
23 Continuous opening
24 Ferrule holder
25 Ferrule
26 Spring
27 Shoulder
28 Press-in sleeve
29 Stop edge
30 Crimping sleeve
31 Thin area
32 Tube
33 Connection region
34 Tooth
35 Pin

What is claimed is:

1. A plug connector having a base body and an articulated locking arm, which is integrally formed on the front end of the base body and protrudes obliquely toward the rear, and an unlocking element which is operatively connected to the locking arm and is displaceable in an unlocking direction in relation to the base body such that the locking arm is unlocked, wherein the unlocking element has a displacement element which is displaceable in the unlocking direction and is operatively connected to the base body, with the displacement element and the locking arm operatively connected by a clip, and with the displacement element having one of a C- and U-shaped cross section which at least partially surrounds the base body or is snapped onto said base body, or having an annular cross section which completely surrounds the base body.

2. The plug connector as claimed in claim 1, wherein the clip is arranged in an articulated manner.

3. The plug connector as claimed in claim 2, wherein the clip and the locking arm are of integral design.

4. The plug connector as claimed in claim 2, wherein the clip and the displacement element are of integral design.

5. The plug connector as claimed in claim 1, wherein the displacement element is operatively connected to the base body in a detachable manner.

6. The plug connector as claimed in claim 1, wherein the displacement element and/or the base body have/has means for limiting displacement in and/or counter to the unlocking direction.

7. The plug connector as claimed in claim 1, wherein the clip is operatively connected to the displacement element and/or to the locking arm by a film hinge or a mechanical hinge.

8. The plug connector as claimed in claim 1, wherein the clip interacts with the locking arm by means of a ramp.

9. The plug connector as claimed in patent claim 8, wherein the locking arm has a ramp.

10. The plug connector as claimed in patent claim 9, wherein the locking arm has a thick area on the sides of which a ramp is formed.

11. The plug connector as claimed in patent claim 9, wherein the unlocking element has a clip with a pin which projects laterally inward and interacts with the ramp during an unlocking operation.

12. The plug connector as claimed in claim 1, wherein the plug connector has coupling means for lateral operative connection to a further plug connector.

13. The plug connector as claimed in claim 12, wherein the coupling means are arranged on the base body and/or the displacement element.

14. The plug connector as claimed in claim 12, wherein the coupling means comprise projecting pins and corresponding recesses which prevent the plug connectors from twisting in relation to one another.

15. The plug connector as claimed in patent claim 9, wherein the base body has a continuous opening, a press-in sleeve being pressed into the rear end of said opening.

16. The plug connector as claimed in patent claim 15, wherein the press-in sleeve has two concentrically arranged circumferential teeth.

* * * * *